United States Patent [19]
Wang

[11] Patent Number: 6,014,500
[45] Date of Patent: *Jan. 11, 2000

[54] STOCHASTIC HALFTONING SCREENING METHOD

[75] Inventor: Shen-ge Wang, Fairport, N.Y.

[73] Assignee: Xerox Corporation, Stamford, Conn.

[*] Notice: This patent is subject to a terminal disclaimer.

[21] Appl. No.: 09/088,042

[22] Filed: Jun. 1, 1998

[51] Int. Cl.⁷ .............................. B41B 15/00; B41J 15/00; G06F 15/00; H04N 1/40
[52] U.S. Cl. ........................... 395/109; 358/456; 358/457; 358/455
[58] Field of Search .................................... 358/429, 448, 358/455, 456, 457, 458; 395/109

[56] References Cited

U.S. PATENT DOCUMENTS

| | | | |
|---|---|---|---|
| 4,149,194 | 4/1979 | Holladay | 358/298 |
| 5,014,123 | 5/1991 | Imoto | 358/506 |
| 5,214,517 | 5/1993 | Sullivan et al. | 358/456 |
| 5,305,118 | 4/1994 | Schiller et al. | 358/456 |
| 5,394,252 | 2/1995 | Holladay et al. | 358/533 |
| 5,673,121 | 9/1997 | Wang | 358/456 |
| 5,696,602 | 12/1997 | Cooper et al. | 358/455 |
| 5,745,660 | 4/1998 | Kolpatzik et al. | 358/456 |

*Primary Examiner*—Kimberly A. Williams
*Attorney, Agent, or Firm*—Lloyd F. Bean, II

[57] ABSTRACT

Special stochastic screens are generated to eliminate the moiré between stochastic screens and checkerboard inputs. Using the checkerboard pattern, we can divide the entire stochastic screen S into two subsets: $S_1$ is defined by all pixels, which lie on the white half of the checkerboard, and $S_2$ is by the black half. The design of a stochastic screen is a mathematical optimization process, which as a single-value merit function as Q(S), so the design process can be described as maximizing Q(S). To eliminate the moiré between the checkerboard input and the stochastic screen, the same design criteria to the two subsets, $S_1$ and $S_2$, individually, as well as to the entire set S is applied.

8 Claims, 6 Drawing Sheets

STOCHASTIC HALFTONING SCREENING METHOD

SUMMARY OF THE PRESENT INVENTION

The present invention is directed to a method and apparatus for halftoning gray images and more particular to the generation of stochastic halftone screens in printers for printing engineering drawings.

BACKGROUND OF THE INVENTION

Color in documents is the result of a combination of a limited set of colors over a small area, in densities selected to integrate to a desired color response. This is accomplished in many printing devices by reproducing separations of the image, where each separation provides varying density of a single primary color. When combined together with other separations, the result is a full color image.

In the digital reproduction of documents, a separation is conveniently represented as a monochromatic bitmap, which may be described as an electronic image with discrete signals (hereinafter, pixels) defined by position and density. In such a system, density is described as one level in a number of possible states or levels. When more than two levels of density are used in the description of the image, the levels are often termed "gray", indicating that they vary between a maximum and minimum, and without reference to their actual color. Most printing systems have the ability to reproduce an image with a small number of levels, most commonly two, although other numbers are possible. Common input devices including document scanners, digital cameras and the computer imagery generators, however, are capable of describing an image with a substantially larger number of gray levels, with 256 levels a commonly selected number, although larger and smaller levels are possible. It is required that an image initially described at a large set of levels also be describable at a smaller set of levels, in a manner which captures the intent of the user. In digital reproduction of color documents this means that each of the color separations is reduced from the input number of levels to a smaller output number of levels. The multiple color separations are combined together at printing to yield the final color print. Commonly, color documents are formed using cyan, magenta and yellow colorants or cyan, magenta, yellow and black colorants. A larger number or alternative colorants may also be used.

Printers typically provide a limited number of output possibilities, and are commonly binary, i.e., they produce either a spot or no spot at a given location (although multilevel printers beyond binary are known). Thus, given an image or a separation in a color image having perhaps 256 possible density levels, a set of binary printer signals must be produced representing the contone effect. In such arrangements, over a given area in the separation having a number of contone pixels therein, each pixel value in an array of contone pixels within the area is compared to one of a set of preselected thresholds as taught, for example, in U.S. Pat. No. 4,149,194 to Holladay. The effect of such an arrangement is that, for an area where the image is a contone, some of the thresholds will be exceeded, i.e. the image value at that specific location is larger than the value of the threshold for that same location, while others are not. In the binary case, the pixels or cell elements for which the thresholds are exceeded might be printed as black or some color, while the remaining elements are allowed to remain white or uncolored, dependent on the actual physical quantity described by the data. The described halftoning or dithering method produces an output pattern that is periodic or quasiperiodic in the spatial coordinates.

U.S. Pat. No. 5,673,121 discloses an idealized stochastic screen is characterized by all of the predominant color dots (black or white) uniformly distributed. The present invention seeks to approach this optimization by iteratively selecting pairs of threshold levels in the screen matrix, and measuring the approach to the idealized stochastic screen. The threshold values are then swapped in position to determine whether the swap improves the measurement or not. If it does, the swap is maintained. The process is iterated until the desired result is obtained.

When halftone-based printers are used for engineering drawings, the most critical requirement for halftoning is the quality of reproducing fine lines, which can be in arbitrary angles, in any colors and often only in few-pixel wide. Since stochastic screens provide highest resolutions at all possible levels with all possible orientations, they are widely accepted as the best choice for halftoning vector inputs such as engineering drawings.

The design criteria for stochastic screens require all minority pixels, black or white, are separated as much as possible. For most input levels the outputs of stochastic screens have "blue-noise" spatial spectra which provide pleasant appearance. However, due to the raster-structure limitation, near the theoretical 50% input level the design criteria force the halftone output toward a checkerboard pattern, which possesses only two equal spatial frequencies at orthogonal directions. FIG. 1 shows a typical stochastic halftone output with a spatial constant input at the 50% level. Unfortunately, checkerboard patterns are often used in engineering drawings to represent different gray levels or colors. When the input is gray checkerboard pattern, i.e., at least one of the two levels is neither 0 nor 100%, the halftone output by a stochastic screen show noisy beating, or moiré, between the input and the screen. For example, FIG. 2 shows the output of a 0/50% checkerboard input halftoned by the same stochastic screen used for FIG. 1.

The above references are herein incorporated by reference for their teachings.

SUMMARY OF THE INVENTION

The present invention obviates the above mention problems by providing

These and other aspects of the invention will become apparent from the following descriptions used to illustrate a preferred embodiment of the invention, read in conjunction with the accompanying drawings in which.

Figure 5:
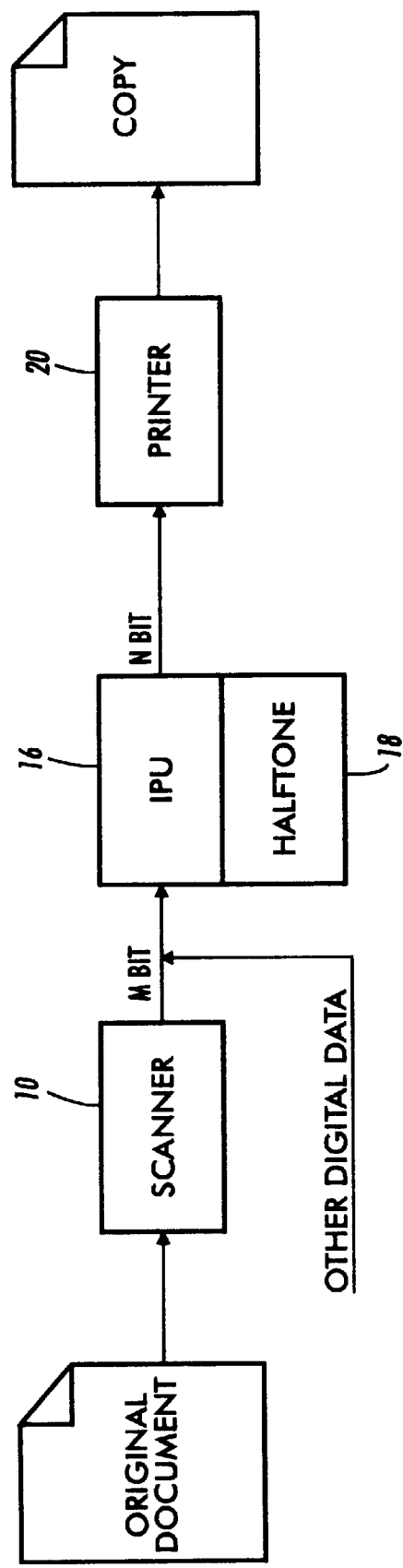
FIGS. 5 and 6 represent a halftoning system in which the present invention finds use.

Referring now to the drawings where the showings are for the purpose of describing an embodiment of the invention and not for limiting same, a basic image processing system is shown in FIG. 5. In the present case, gray image data may be characterized as image signals, each pixel of which is defined at a single level or optical density in a set of 'c' optical density levels, the number of members in the set of levels being larger than desired. Each pixel will be processed in the manner described hereinbelow, to redefine each pixel in terms of a new, smaller set of 'd' levels. In this process, 'c' and 'd' are integer values representing pixel depth, or a number of signal levels at which the pixel may appear. One common case of this method includes the conversion of data from a relatively large set of gray levels to one of two legal or allowed binary levels for printing in a binary printer.

As used herein, the term "dot pattern" refers to a product or an image resulting from a screening process. A "screen cell", as used herein, refers to the set of pixels which together will form the dot pattern, while the term "screen matrix" will be used to describe the set of values which together make up the set of threshold to be applied. A "pixel" refers to an image signal associated with a particular position in an image, having a density between white and black. Accordingly, pixels are defined by intensity and position. A dot pattern is made up of a plurality of pixels. These terms are used for simplification and it should be understood that the appropriate sizing operations have to be performed for images where the input resolution in terms of scan pixels is different from the output resolution in terms of print pixels.

The present invention can be employed in a black/white copier, such as Xerox 8830 Engineering Printer or in a typical color system where color documents are represented by multiple sets of image signals, each set (or separation) represented by an independent channel, which is usually processed more or less independently. A "color image" as used herein is therefore a document including at least two separations, such as in the Xerox 4850 Highlight Color Printer and commonly three or four separations, such as in the Xerox 4700 Color Laser Printer, Xerox 5775 Digital Color Copier, or the Xerox 4900 printer, or sometimes more than four separations (a process sometimes called hi-fi color). One possible digital copier (a scanner/printer combination) is described for example, in U.S. Pat. No. 5,014,123, incorporated herein by reference. Each separation provides a set of image signals which will drive a printer to produce one color of the image. In the case of multicolor printers, the separations superposed together form the color image. In this context, we will describe pixels as discrete image signals, which represent optical density of the document image in a given small area thereof. The term "pixel" will be used to refer to such an image signal in each separation, as distinguished from "color pixel", which is the sum of the color densities of corresponding pixels in each separation. "Gray", as used herein does not refer to a color unless specifically identified as such. Rather, the term refers to image signals which vary between maximum and minimum, irrespective of the color of the separation in which the signals are used.

With reference now to FIG. 5, which shows a general system requirement representing the goal of the invention, an electronic representation of an original document (hereinafter, an image) from image input terminal such as scanner 10 derives electronic digital data in some manner, in a format related to the physical characteristics of the device, and commonly with pixels defined at m bits per pixel. Common color scanners, such as, for example, Xerox 5775 Digital Color Copiers, or the Pixelcraft 7650C, produce 8 bit/pixel data, at resolutions acceptable for many purposes. Since this is a color document, the image is defined with two or more separation bitmaps, usually with identical resolution and pixel depth. The electronic image signals are directed through an image processing unit (IPU) 16 to be processed so that an image suitable for reproduction on image output terminal or printer 20 is obtained. Image processing unit 16 commonly includes a halftone processor 18 which converts m bit digital image signals to n bit digital image signals, suitable for driving a particular printer, where m and n are integer values. It also well within the contemplation of the present invention, to derive images electronically. In such cases, the images may be represented by a page description language file, describing the appearance of the page. In such a case, the IPU might include processing element for decomposition of the page, and color conversions elements for providing appropriate signals for driving a printer.

Figure 6:
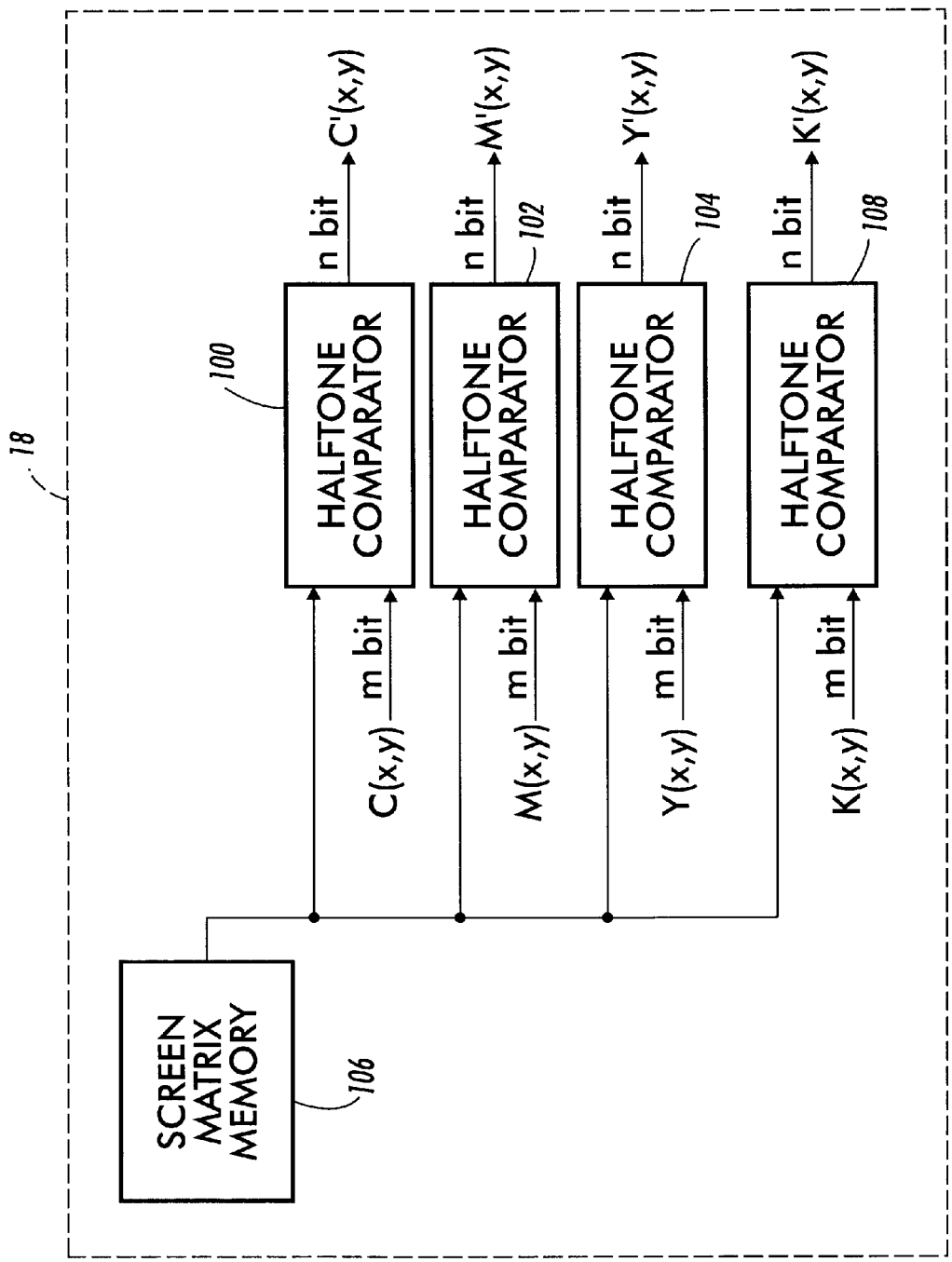

FIG. 6 shows the halftone processor 18 operational characteristics. In this example, there is illustrated a color processing system, using four separations, $C(x, y)$, $M(x,y)$, $Y(x, y)$, $K(x, y)$, obtained and each processed independently for halftoning purposes to reduce an m-bit input to an n-bit output. It will be appreciated that the invention is also applicable to the "single separation" or black and white reproduction situation as well. Accordingly, we show a source of screen matrix information, screen matrix memory 106, which provides one input to each comparator 100, 102, 104, and 108 for each separation, where the other input is the m bit separation bitmap. The output is n bit output, which can be directed to a printer. This illustration is highly simplified, in that distinct screen matrices may be supplied to each comparator.

Now, consider generating halftone images from constant gray-scale inputs by a screen matrix with N elements. If the overlap between adjacent pixels is ignored, the screen cell with n black pixels and N−n white pixels simulates the input with a gray scale (g) equal to $g=(N-n)/N$, where $0 \leq n \leq N$, or $0 \leq g \leq 1$. The visual appearance of this pattern depends on whether the black pixels or the white pixels are minorities. If the black pixels are, i.e., $0.5 < g \leq 1.0$, the best visual appearance of the halftone pattern occurs when all black pixels are "evenly" distributed, in other words, each black pixel should "occupy" $1/n$, or $1/(1-g)N$, fraction of the total area of the screen. Therefore, the average distance of adjacent black pixels should be equal to $\alpha(1-g)^{-\frac{1}{2}}$, where $\alpha$ is independent of gray levels. On the other hand, if the white pixels are minorities, i.e., $0 \leq g \leq 0.5$, each white pixel should "occupy" $1/(N-m)$ or $1/gN$, fraction of the total area and the average distance of adjacent white pixels should be equal to $\alpha g^{-\frac{1}{2}}$. An idealized stochastic dithering screen is defined as a threshold mask generating halftone images which satisfy above criterion for all gray levels.

For the following discussion, the input gray-scale images are specified by integer numbers, $G(x, y)$, where $0 \leq G \leq M$. Under this assumption the dithering screen should have M different threshold values spanning from zero to M−1. We further assume that at each level there are (N/M) elements having the same threshold value T. The ultimate goal of designing a stochastic screen is to distribute the threshold values T so that the resulting halftone images are as close as possible to the ones generated by an idealized stochastic screen. Here, it is demonstrated that it is possible to create "good quality" stochastic screens using above criterion and optimization techniques.

Choosing an arbitrary pair of pixels from the dithering screen, we assume that the threshold values for these two pixels are $T_1 = T(x_1, y_1)$ and $T_2 = T(x_2, y_2)$, respectively, where $(x_1, y_1)$ and $(x_2, y_2)$ are the coordinates of these pixels. As the result of dithering a constant input G, the outputs $B_1 = B(x_1, y_1)$ and $B_2 = B_2(x_2, y_2)$ have the following possible combinations:

1. $B_1 = 1$ and $B_2 = 1$, if $G \geq T_1$ and $G \geq T_2$;
2. $B_1 = 0$ and $B_2 = 0$, if $G < T_1$ and $G < T_2$;
3. $B_1 \neq B_2$, where B=1 represents a white spot and B=0, a black spot for printing Under case 3, where one output pixel is black and another is white, their distance is irrelevant to the visual appearance according to the criterion discussed above. For case 1, we can further consider the difference between the two situations:

1a. if $M/2 \geq G$, $G \geq T_1$, $G \geq T_2$;

1b. elsewhere.

Under case 1a, both output pixels are white, and white spots are minorities. Therefore, the corresponding distance between $(x_1, y_1)$ and $(x_2, y_2)$ is relevant to the visual appearance of the halftone images. According to our analysis above this distance is greater or equal to $\alpha g^{-\frac{1}{2}}$, or $\alpha(G/M)^{-\frac{1}{2}}$, for outputs of an idealized stochastic screen. Among all G under case 1a, the critical case of G is the smallest one, or $G_c = \text{Max}(T_1, T_2)$, which requires the largest distance between the two pixels $(x_1, y_1)$ and $(x_2, y_2)$.

Similarly, when both dots appear as black dots, the visual appearance under the following cases must be considered:

2a. if $G \leq M/2$; $G > T_1$ and $G > T_2$ 2b. elsewhere.

Among all G under 2a, the largest G is given by $G_c = \text{Min}(T_1, T_2)$, which requires the largest distance $\alpha (1-G_c/M)^{-\frac{1}{2}}$ between $(x_1, y_1)$ and $(x_2, y_2)$.

Mathematically, we can use a merit function $q(T_1, T_2)$ to evaluate the difference between the idealized stochastic screen and the chosen one. For example, we used the following choice for the experiment described later:

$$q(T_1, T_2) = \exp(-C \cdot d^2/d_c^2), \quad (1)$$

where $d^2 = (x_1-x_2)^2 + (y1-y_2)^2$;

$d_c^2 = M/[M-\text{Min}(T_1, T_2)]$, if $T_2 > M/2$ and $T_1 > M/2$, $d_c^2 = M/\text{Max}(T_1, T_2)$, if $T_2 \leq M/2$, and $T_1 \leq M/2$, $d_c^2 = 0$, i.e., q=0, elsewhere;

and C is a constant.

Since a dithering screen is used repeatedly for halftoning images larger than the screen, for any chosen pair of pixels from the dithering screen the closest spatial distance in corresponding halftone images depends on the dithering method and should be used for the merit function. The overall merit function should include contributions of all possible combinations. In an experiment the summation of $q(T_1, T_2)$ was for optimization, i.e., $$Q = \Sigma q(T_1, T_2), \quad (2)$$

where $\Sigma$ for all $(x_1, y_1) \neq (x_2, y_2)$.

Now, the design of stochastic screens becomes a typical optimization problem. When the threshold values of a chosen screen are rearranged, the merit function can be evaluated to determine the directions and steps. Many existing optimization techniques can be applied to this approach. The simplest method is to randomly choose a pair of pixels and swap threshold values to see if the overall merit function Q is reduced, Since only those q values related to the swapped pair need to be recalculated, the evaluation of Q does not consume significant computation time.

In an example, using the proposed design procedure to produce a screen matrix with b 128×64elements and 256 gray levels was produced. All initial threshold values were randomly chosen by a standard random number generator. Alternatively, the threshold assignments from an existing screen may be used. Besides the Gaussian function described by Eq. (1) as the merit function other functions were tested, such as the Butterworth function and its Fourier transform. Other optimization functions are possible. For this example, Equations (1) and (2) were used as the merit function of optimization. Since this mask is a 45° rotated screen, the 128×64 pattern is repeated with a lateral shift equal to 64. To calculate the overall merit function we considered all pairs of pixels including those with the shift. A Sun Sparc 10 workstation was used for this design test.

Figure 1:
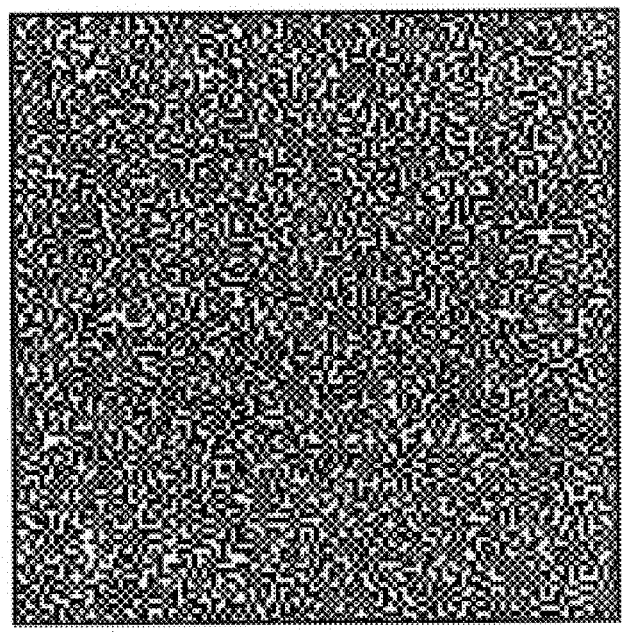
FIGS. 1 and 2 are prior art; a typical stochastic halftone output.
Figure 2:
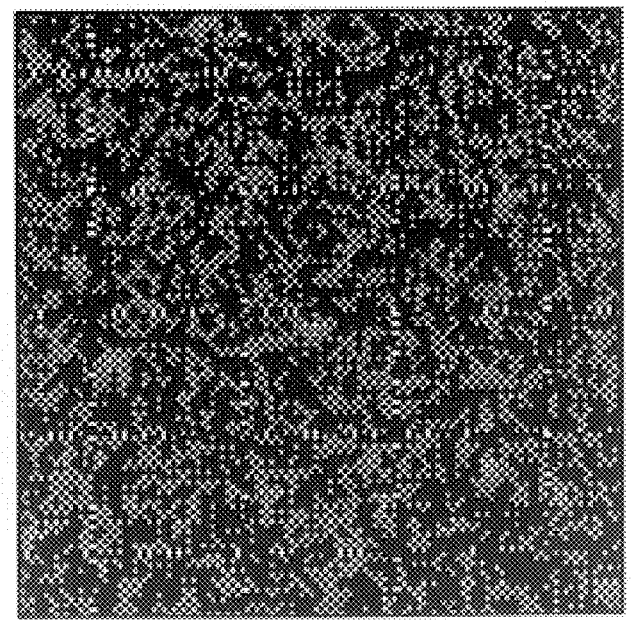
Figure 3:
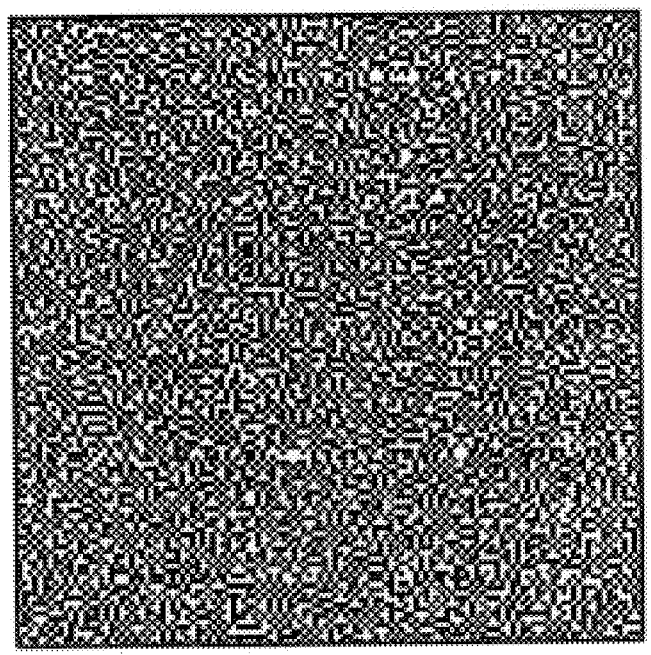
FIGS. 3 and 4 illustrate the outputs halftoned by the stochastic screen of the present invention.

For each iteration we randomly chose a pair of pixels from the dithering screen, swapped their threshold values and calculated the change of the merit function Q. If Q was not reduced, we restored the threshold values, otherwise, we proceeded to the next iteration. In FIG. 3, the merit value Q against the number of accumulated "positive" swaps is shown by the solid lines, while the accumulated computation time in seconds is shown by the dash lines. Increasing the number of swaps tends to improve imaging results from the screens, as the screen matrix becomes more idealized.

It is possible that, depending on the obtained value of the merit function, in some percentage of iterations, the changed threshold values are kept even though they do not improve the merit function Q, a process known as simulated annealing.

Figure 8:
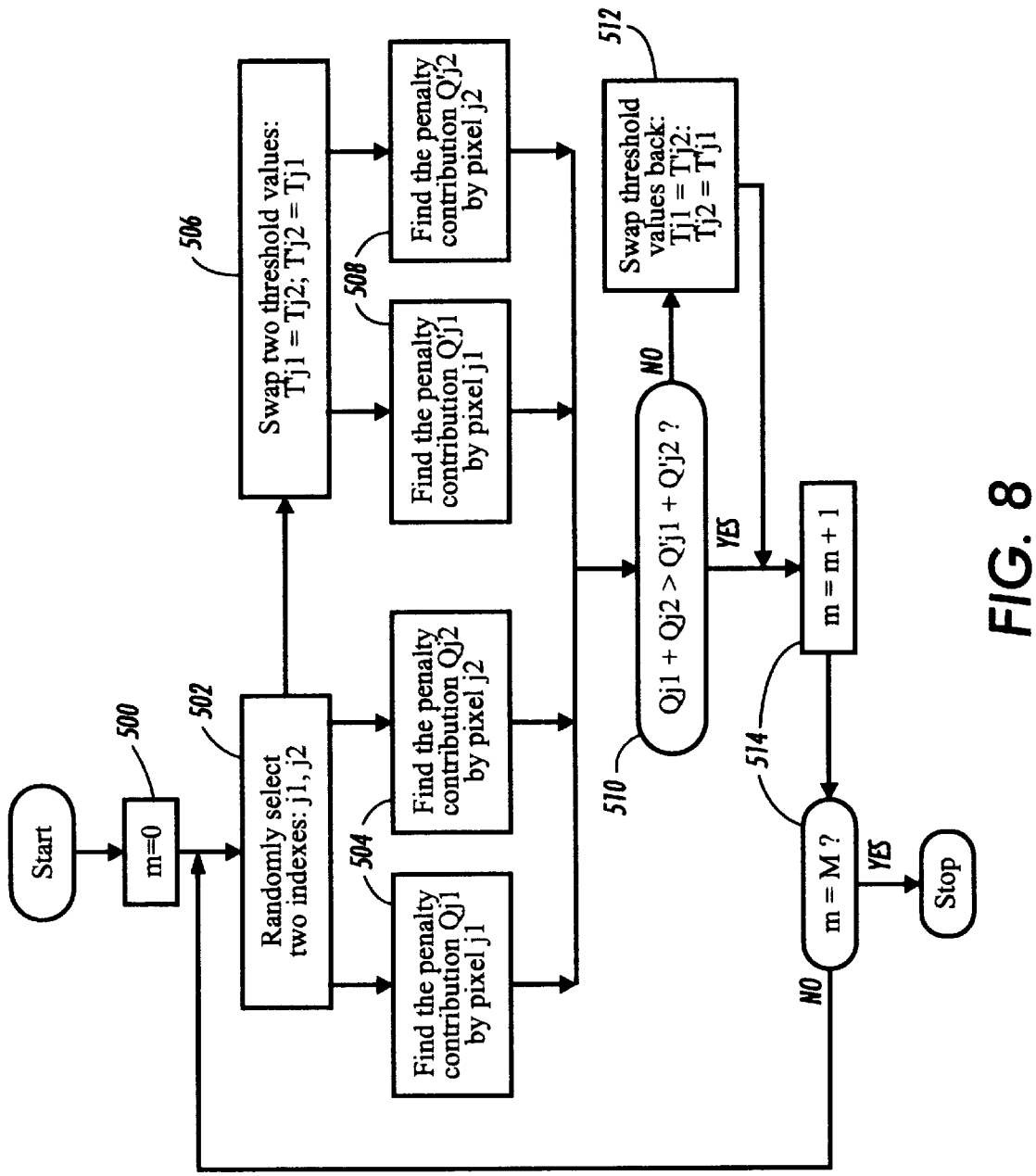
FIG. 8 illustrates the global quality measurement used to derive an optimized threshold screen.

Turning now to FIG. 8 and an implementation of the invention, the invention is readily implemented in a general purpose computer, programmed to generate the screen matrix values. Once obtained, the screen matrix values may be readily entered and stored into a halftoning device memory, such as that shown in FIG. 6.

Figure 7:
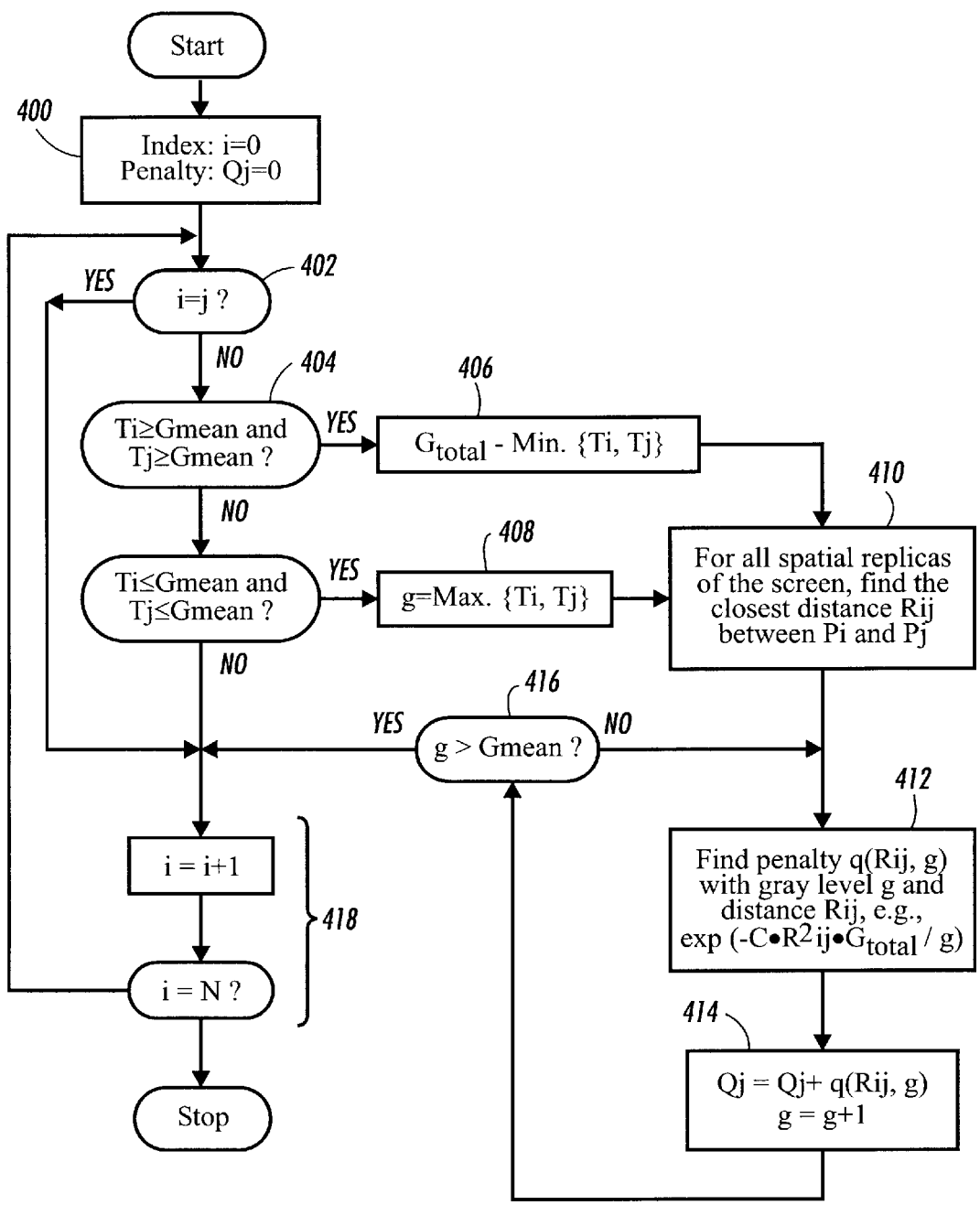
FIG. 7 illustrates the measurement of Rij.

One possible embodiment of the invention might take the form of a computer programmed in accordance with the following method, shown in FIG. 7. For a given pixel $P_j$, located at $x_j$, $y_j$ and with threshold value $T_j$, we find its contribution $Q_j$ to the total penalty function $Q_{total}$. All pixels of the given threshold screen with N elements are indexed from 0 to N−1. Each pixel $P_i$ is associated with its index i, the spatial location $x_i$, $y_i$ and the threshold value $T_i$. The mean of the gray scale is $G_{mean}$ and the full range of gray scale is $G_{total}$.

At step 400, index values, including i and $Q_j$ are set to 0. Value i refers to the index to all pixels other than $P_j$, while $Q_j$ refers to the total contribution by all pairs of $P_j$ and $P_i$ Step 402 checks a counter keeping the calculations when i=j. Step 404 provides a test wherein each threshold value in the system is compared to the mean gray value for the system, $G_{mean}$. If the threshold values are both greater than $G_{mean}$, g is set to $G_{total}-\text{Min}\{t_i, T_j\}$ at step 406. It the threshold values are both less than $G_{mean}$, g is set to $\text{Max}\{t_i, T_j\}$. In such case, at step 410, for all the spatial replicas of the screen, we calculate the closest distance Rij between Pi and $P_j$. At step 412, using the distance $R_{i,j}$, we calculate the penalty value $q(R_{ij}, g)$ with gray level g and distance $R_{i,j}$, e.g., exp(−$C \cdot R^2 ij \cdot G_{total}/g$). Steps 414 and 416 form an iterative loop with step 412, iteratively calculating $Q_j = Q_j + q(R_{ij}, g)$ and g=g+1 and determining whether g>$G_{mean}$. If it is not, the penalty value $q(R_{ij}, g)$ at the next gray level is recalculated and added to the total contribution $Q_j$. If g>$G_{mean}$, the value of i is incremented and checked for completion of the iterative process at step 418 and the process is either ended or iterated for the next pixel.

FIG. 8, shows a flow chart of a process that optimizes the operation for M iterations. At step 500, m is set equal to 0. At step 502, $j_1$ and $j_2$ are randomly selected. Based on these values, two processes occur, 504) penalty contributions $Q_{j1}$ and $Q_{j2}$ are calculated for pixel $j_1$ and $j_2$ respectively, and 506) two corresponding threshold values are swapped so that $T'_{j1}$ is set equal to $T_{j2}$ and $T'_{j2}$ is set equal to $T_{j1}$. At step 508, from the new values of $T'_{j1}$ and $T'_{j2}$, we calculate the penalty contribution $Q'_{j1}$, by pixel $j_1$, and the penalty contribution $Q'_{j2}$, by pixel $j_2$, respectively.

At step 510 from the calculated penalty values $Q_{j1}$, $Q_{j2}$, $Q'_{j1}$ and $Q'_{j2}$, we determine whether $Q_{j1}+Q_{j2}>Q'_{j1}+Q'_{j2}$. If not, at step 512, we reset $T'_{j1}$ and $T'_{j2}$ to their original values. Otherwise, we maintain the new threshold values, and at step 514 we increment m for another iteration and determine whether we have reached a final iteration.

Typically speaking, threshold screens will be calculated and stored for later distribution as matrices of threshold values. Upon later distribution, these matrices can be downloaded in an appropriate manner into device memories for use as required.

Having in mind the principles on how stochastic screens are optimized from the above discussion, the concepts of the present invention may be readily understood. As mentioned early, due to the raster-structure limitation, near the theoretical 50% input level the design criteria force the halftone output toward a checkerboard pattern, which possesses only two equal spatial frequencies at orthogonal directions. Unfortunately, checkerboard patterns are often used in engineering drawings to represent different gray levels or colors. When the input is gray checkerboard pattern, i.e., at least one of the two levels is neither 0 nor 100%, the halftone output by a stochastic screen show noisy beating, or moiré, between the input and the screen. In the present invention special stochastic screens are generated to eliminate the moiré between stochastic screens and checkerboard inputs. Using the checkerboard pattern, we can divide the entire stochastic screen S into two subsets: $S_1$ is defined by all pixels, which lie on the, white half of the checkerboard, and $S_2$ is by the black half. Or mathematically, if all pixels are specified by the coordinates of columns and rows, i and j, we can define that $p(i,j) \in S_1$, if $(i+j)\ \%2=0$;

$p(i,j) \in S_2$, if $(i+j)\ \%2=1$;

$$S = S_1 + S_2. \tag{3}$$

As described previously, to design a "normal" stochastic halftone screen, certain criteria are applied to the entire set S. The design of a stochastic screen is a mathematical optimization process, which can be characterized as a single-value merit function Q defined by Equations (1) and (2). So, the design process can be described as maximizing Q(S). To eliminate the moiré between the checkerboard input and the stochastic screen, we apply the same design criteria to the two subsets, $S_1$ and $S_2$, individually, as well as to the entire set S. The new merit function, Q', is composed of three parts:

$$Q' = Q(S) + w \cdot Q(S_1) + w \cdot Q(S_2), \tag{4}$$

where w is the weight for balance of the overall quality and the moiré removal. In our practice, we chose w~0.3.

Figure 4:
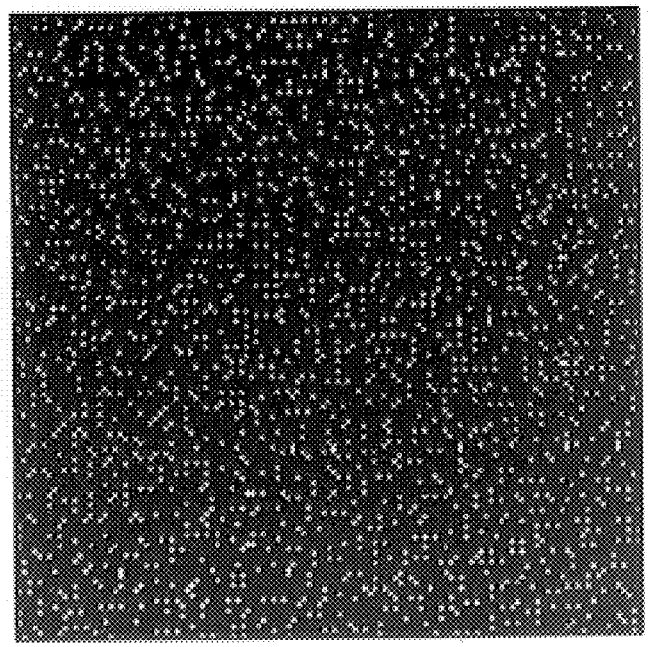

FIGS. 3 and 4 show the outputs halftoned by a stochastic screen designed by the proposed method: FIG. 3 is with a spatial constant input at 50% level and FIG. 4 is with a 0/50% checkerboard input.

The resulting threshold screens may be used for the generation of gray in monochromatic images. They may also be used for the generation of color separations in polychromatic or other multiple separation images. In polychromatic or color images, these stochastic screens may be used exclusively, or in combination with other stochastic or nonstochastic screens, as taught, for example, by U.S. Pat. No. 5,394,252 to Holladay et al.

The disclosed method may be readily implemented in software using object oriented software development environments that provide portable source code that can be used on a variety of computer or workstation hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

I claim:

1. A printing system suitable for forming marks on a substrate at one of c possible levels of colorant, and receiving image signals represented at d possible levels, where d>c, and having a halftone processor to reduce the number of levels at which the image is represented from d levels to c levels in order to replicate gray level printing, including:

a memory, storing a set of halftone threshold level signals, each threshold signal corresponding to a unique location in a halftone cell;

a comparator, receiving said image signal and one of the halftone threshold signals from the memory, and producing an output signal at one of c possible levels, varying according to the comparison of said halftone threshold signal to said image signal to cause marking at a selected location on a substrate; wherein the comparator comprises:

means for associating said set of halftone threshold level signals to a checkerboard pattern;

means for dividing halftone threshold level signals into two subsets corresponding to the said checkerboard pattern: one subset includes all halftone threshold level signals spatially located at corresponding "white cells" of the checkerboard pattern; while another subset includes all halftone threshold level signals spatially located at corresponding "black cells" of the checkerboard pattern;

said two subsets individually, as well as the combination of the two subsets of threshold level signals are calculated by an iterative optimization process which moves thresholds through a threshold screen cell matrix order until, for reproduction of an image in which one output level predominates over another level, the screen cell matrix thresholds are ordered to produce predominating output level marks approximately equally spaced throughout the screen cell matrix order.

2. The system as defined in claim 1 wherein said one subset is defined by all pixels, which lie on the white half of the checkerboard, and said another subset is defined by the black half of the checkerboard.

3. The system as defined in claim 1 wherein c=2, and one level results in black spots being printed, while the other level results in white spots being printed.

4. The system as defined in claim 3, wherein when black spots predominate in a screen cell, the black spots are spaced at approximately equal distances from each other.

5. The system as defined in claim 3, wherein when white spots predominate in a screen cell, the white spots are spaced at approximately equal distances from each other.

6. A method of designing a halftone screen cell, for converting an image received at d levels, for reproduction at 2 levels, the method including the steps:

a. initially assigning a set of threshold signals varying across a range of gray levels to locations in a screen matrix, each threshold signal defined by value and position in the matrix;

b. associating said screen matrix with a checkerboard pattern;

c. dividing said checkerboard pattern into two subsets of halftone threshold level signals;

d. selecting a matrix from a group consisting of said screen matrix, a first of the two subsets and said second of the two subsets;

e. selecting at least two threshold signals from said matrix;

f. for a selected halftone level, characterizing the uniformity of distribution of spots through the halftone screen cell;

g. swapping the two threshold signal positions in the matrix;

h. recharacterizing the uniformity of distribution of spots through the halftone screen cell;

i. as a function of the recharacterization, selecting one of maintaining the threshold signals in the swapped positions on the halftone screen and otherwise returning the threshold values to the initial positions;

j. iteratively repeating a preselected number of iterations, steps d through i;

k. repeating steps e–j until each matrix has been selected.

7. The method as defined in claim 6, wherein the initial assignment of the set of threshold signals is random.

8. The method as defined in claim 6, wherein uniformity is characterized by a function Q for each said of at least two thresholds $T_1$ at position $x_1, y_1$ in the screen matrix and $T_2$ at position $x_2, y_2$ in the screen matrix, where a local measurement includes:

$$q(T_1, T_2) = \exp(-C \cdot d^2 / d_c^2), \quad (1)$$

where $d^2 = (x_1 - x_2)^2 + (y_1 - y_2)^2$;

$d_c^2 = M/[M - \text{Min}(T_1, T_2)]$, if $T_2 > M/2$ and $T_1 > M/b$ 2, $d_c^2 = M/\text{Max}(T_1, T_2)$, if $T_2 \leq M/2$ and $T_1 \leq M/2$, $d_c^2 = 0$, i.e., $q = 0$, elsewhere;

C is a constant; and

M is a number of threshold values in the screen and Q is given by $$Q = \Sigma q(T_1, T_2)$$

where $\Sigma$ for all $(x_1, y_1) \neq (x_2, y_2)$.

* * * * *